(12) United States Patent
Bergum et al.

(10) Patent No.: US 6,189,568 B1
(45) Date of Patent: Feb. 20, 2001

(54) SERIES MOUNTABLE GAS VALVE

(75) Inventors: Glenn R. Bergum, St. Anthony Village; David M. Edlund, New Brighton, both of MN (US)

(73) Assignee: Honeywell International Inc., Morristown, NJ (US)

( * ) Notice: Under 35 U.S.C. 154(b), the term of this patent shall be extended for 0 days.

(21) Appl. No.: 09/213,704

(22) Filed: Dec. 17, 1998

(51) Int. Cl.⁷ .................................................. F16K 5/10
(52) U.S. Cl. .................. 137/613; 137/798; 137/315; 251/152; 251/901
(58) Field of Search ............................ 251/901, 148, 251/152; 137/798, 613, 315

(56) References Cited

U.S. PATENT DOCUMENTS

| | | | |
|---|---|---|---|
| 3,405,910 | * 10/1968 | Scaramucci | 251/148 |
| 3,409,268 | * 11/1968 | Gachot | 251/148 |
| 4,023,773 | * 5/1977 | Wise | 251/148 |
| 4,304,261 | * 12/1981 | Forester | 137/613 |
| 4,732,192 | * 3/1988 | Shen | 137/614.19 |

* cited by examiner

Primary Examiner—A. Michael Chambers
(74) Attorney, Agent, or Firm—Charles L. Rubow

(57) ABSTRACT

A gas flow control valve configured to facilitate back-to-back mounting with a second, similarly constructed valve. The gas valve includes a valve body defining an inlet port and an outlet port, the inlet and outlet ports being surrounded by seal forming O-rings of different diameters. Flanges surrounding the inlet and outlet ports are configured with distinct attachment features for accommodating bolts for securing one valve in series with another or with a pipe flange or other auxiliary device, the inlet flange having either a slot dimensioned to hold and prevent rotation of a bolt head or nut, or a clearance slot permitting use of a wrench, and the outlet flange having the other slot configuration.

18 Claims, 5 Drawing Sheets

SERIES MOUNTABLE GAS VALVE

BACKGROUND OF THE INVENTION

The present invention relates to a gas valve. More particularly, it relates to a gas valve configured for back-to-back mounting with a second, similarly designed valve.

A variety of different gas-based heating equipment are available for use with various commercial/industrial applications. These appliances generally employ one or more gas burners, each supplied with liquefied petroleum (LP), natural or manufactured gas. Additionally, commercial/industrial gas heating equipment installations include one or more valves for controlling the flow of gas to the burner. In this regard, a number of different gas valve types exist, each having certain performance features and corresponding costs. For example, valves typically used in gas flow applications include diaphragm valves, solenoid valves, vent valves, shut-off valves, metering valves, butterfly valves, and fluid power valves, to name but a few.

While all of the above-identified valves are available for controlling gas flow, in many instances, a specific valve combination, or valve train, is required. As a point of reference, with most large scale commercial/industrial gas burning applications, the gas flow rate and consumption volume is very high. In light of the potential hazards associated with these applications, the Underwriters Laboratories Inc. (UL) has established valve train safety standards for commercial/industrial gas heating equipment. In particular, UL 795 sets forth the following valve requirements for mechanical-draft or atmospheric gas burners. For an installation having a gas burner input of 400,000 to 2,500,000 Btu/H (British thermal unit per hour), one valve rated for safety shut-off service (SSOV) is required. For installations having a gas burner input in the range of 2,500,000 to 5,000,000 Btu/H, two SSOV's in series, or one SSOV of the type incorporating a valve seal overtravel interlock, is required. For installations utilizing a gas burner input in the range of 5,000,000 to 12,500,500 Btu/H, two SSOV's in series, one of which incorporates a valve seal overtravel interlock, is required. Finally, for gas burner inputs in excess of 12,500,000 Btu/H, two SSOV's in series, one of which incorporates a valve seal overtravel interlock, is required. Further, for installations having burner inputs of 12,500,00 Btu/H or more, if the fuel gas has a specific gravity of less than 1.0, a normally open vent valve must be incorporated in line between the two SSOV's.

The above-provided UL code essentially dictates the required valve train configuration for most commercial/industrial gas burner applications. Pursuant to the UL code, then, many gas burner supply lines must include two safety shut-off valves mounted in series. Further, certain other applications require an additional vent valve disposed between the two safety shut-off valves. It should be noted that customers and/or installers may prefer to use two or more valves mounted in series for reasons other than UL code compliance. Currently, installation of two valves in series is relatively burdensome. Regardless of the exact valve type, virtually every gas valve includes a valve body defining an inlet port and an outlet port. Each of the inlet port and outlet port are internally threaded. Thus, in order to assemble two gas valves in series, a short length of appropriately sized pipe (or a "pipe nipple") must be formed and threaded. The pipe nipple is then threaded into the outlet port of the first valve and the inlet port of the second valve. Obviously, this labor intensive procedure is time consuming, and increases the overall length of the valve train. The mounting procedure is further complicated where a third valve, such as a vent valve, is necessary. An additional concern arises when one of the valves malfunctions. Replacement of the defective valve is cumbersome and therefore time-consuming. In short, current gas valve designs do not allow for a direct mounting of two gas valves back-to-back; instead, a pipe nipple must be used.

Recently, in response to the frequent installation requirement of two valves mounted in series and the associated difficulties of assembly, a singularly cast, two valve body design has been made available. The integrally casted, dual valve device does simplify the gas line assembly procedure in that it is no longer necessary to create and install a pipe nipple between the two valves. Unfortunately, however, certain other problems may arise. For example, the user is limited to the type of valve(s) formed in the single casted device. In other words, where the integrally casted, dual valve device incorporates two fluid power valves, the user is not able to replace one of the valves with a less expensive diaphragm valve. Additionally, if one of the continuous casting valves malfunctions, the entire assembly must be replaced even though the second valve may still operate properly.

Code requirements for industrial gas burning equipment require the use of two or more series mounted valves for many applications. The widely accepted practice of connecting the valves with pipe nipples is time-consuming and, therefore, expensive. Thus, a need exists for a gas valve configured to be readily mounted to a second valve in a back-to-back fashion.

SUMMARY OF THE INVENTION

One preferred embodiment of the present invention provides a gas flow control valve comprising a valve body, an inlet O-ring and an outlet O-ring. The valve body includes an inlet portion and an outlet portion. The inlet portion defines an outlet port, whereas the outlet portion defines an outlet port. The inlet O-ring surrounds the inlet port for forming a seal between the inlet portion and an auxiliary device. Similarly, the outlet O-ring surrounds the outlet port for forming a seal between the outlet portion and another auxiliary device. While the inlet port and the outlet port preferably have the same diameter, the inlet O-ring has a diameter different from a diameter of the outlet O-ring.

The above-described gas valve may have a variety of internal control configurations, such as, for example, fluid power, diaphragm or solenoid arrangements. To this end, the gas valve functions in accordance with the internal elements. However, regardless of the internal control configuration, assembly of the gas valve as part of a valve train is simplified. For example, the auxiliary device may be a pipe adapter secured to the inlet portion or the outlet portion. The pipe adapter is sealed to the respective inlet portion or outlet portion via the inlet O-ring or outlet O-ring, respectively. Additionally, the gas valve of the present invention can be rapidly mounted to a similarly configured valve in a back-to-back fashion. For example, the outlet portion of the gas valve may be mounted to an inlet of the second valve. Once again, the outlet O-ring will form a seal between the two devices. Where the second valve is a gas valve in accordance with the present invention and therefore includes an inlet O-ring having a diameter different than a diameter of the outlet O-ring, a dual seal is achieved between the two valves, with each O-ring directly contacting the respective valve surfaces.

Another aspect of the present invention relates to a back-to-back valve train including a first valve and a second valve. The first valve comprises a valve body and an outlet O-ring. The valve body includes inlet portion defining an inlet port and outlet portion defining an outlet port. The outlet O-ring surrounds the outlet port. Similarly, the second valve comprises a valve body and an inlet O-ring. The second valve body includes an inlet portion defining an inlet port and an outlet portion defining an outlet port. The inlet O-ring surrounds the second valve inlet port. The outlet O-ring associated with the first valve has a diameter different from a diameter of the inlet O-ring associated with the second valve. With the above construction in mind, the first valve outlet portion is configured to abut the second valve inlet portion such that the first and second valves are mounted back-to-back. Further, the first valve outlet O-ring has a diameter different than a diameter of the second valve inlet O-ring such that each of the first valve outlet O-ring and the second valve inlet O-ring form a seal between the first valve outlet portion and the second valve inlet portion. In one preferred embodiment, the first valve further includes an outlet coupling means and the second valve includes an inlet coupling means. The outlet coupling means and the inlet coupling means are configured to rapidly couple the first valve outlet portion directly to the second valve inlet portion via a fastening device, such as a bolt and nut. Preferably, one of the outlet coupling means or inlet coupling means is configured to capture a portion of the fastening device.

Yet another aspect of the present invention relates to a method of mounting a first gas flow control valve and a second gas flow control valve back-to-back. The first gas flow control valve includes an outlet portion defining an outlet port. The second gas flow control valve includes an inlet portion defining an inlet port. The method includes securing a first O-ring to the outlet portion such that the first O-ring encircles the outlet port. A second O-ring is secured to the inlet portion such that the second O-ring encircles the inlet port. The second O-ring has a diameter different from a diameter of the first O-ring. The outlet portion is then directly coupled to the inlet portion whereby the first O-ring and the second O-ring each form a seal between the outlet portion and the inlet portion.

DETAILED DESCRIPTION OF THE PREFERRED EMBODIMENTS

Figure 1:
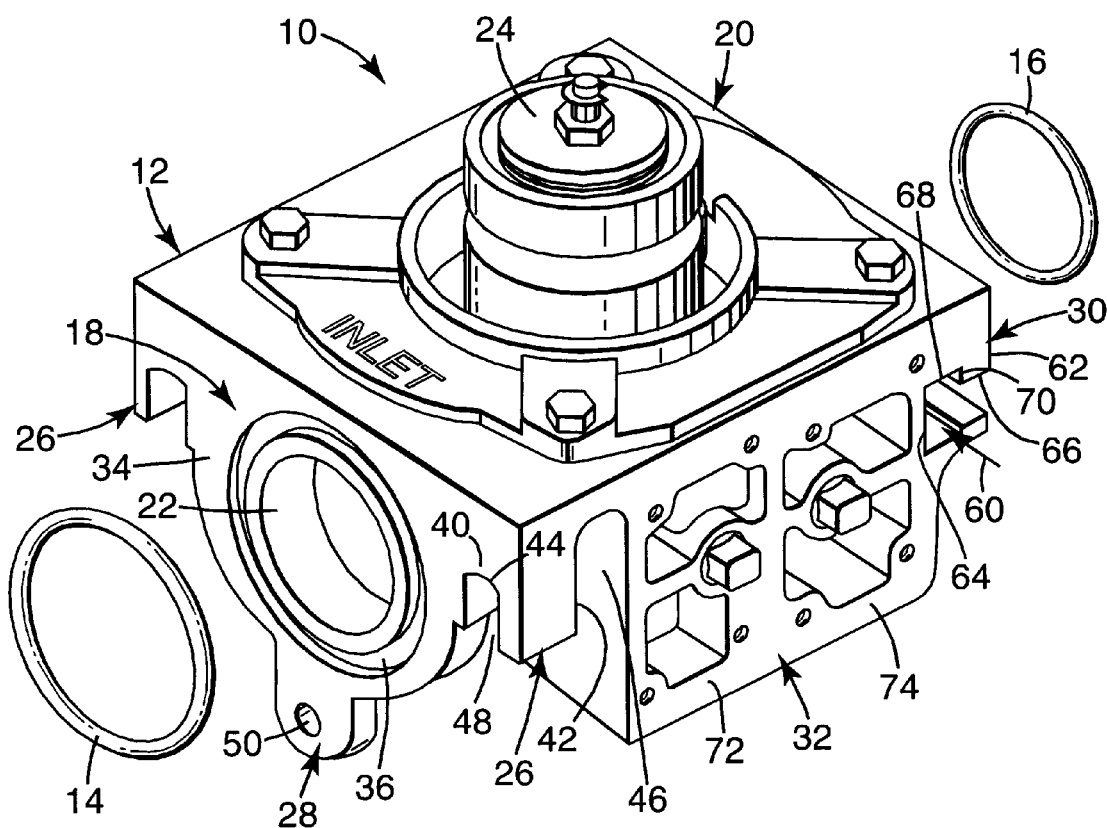
FIG. 1 is a perspective view of a fluid flow control valve in accordance with the present invention.

One preferred embodiment of a gas flow control valve 10 is shown in FIG. 1. Valve 10 includes a valve body 12, an inlet O-ring 14 and an outlet O-ring 16. Valve body 12 includes an inlet portion 18 and an outlet portion 20 (shown partially in FIG. 1). Inlet portion 18 defines an inlet port 22; whereas outlet portion 20 defines an outlet port (not shown). Upon final assembly, inlet O-ring 14 surrounds inlet port 22. Similarly, outlet O-ring 16 surrounds the outlet port.

Relevant features of valve 10 are described in greater detail below. In general terms, however, valve 10 depicted in FIG. 1 conforms generally with a known fluid power, actuator controlled, gas valve. Thus, valve 10 is shown as including a bonnet 24 configured to receive a valve actuator (not shown) for controlling operation of internal valve components (not shown). It should be understood, however, that a valve in accordance with the present invention is in no way limited to a fluid power valve. Instead, valve 10 may be a diaphragm valve, a solenoid valve, a vent valve, a shut-off valve, a metering valve, a butterfly valve, etc. In short, the internal configuration and operation of valve 10 may correspond with any currently available or newly created gas flow control valve.

Valve body 12 preferably includes inlet portion 18, outlet portion 20, inlet coupling means 26, an inlet mounting tab 28, outlet coupling means 30, an outlet mounting tab (not shown) and a component side 32. Valve body 12 is preferably die casted from a rigid material, such as aluminum, so that the various components are integrally formed.

Inlet portion 18 defines inlet port 22, and includes an exterior face 34 forming an annular groove 36. In this regard, exterior face 32 is substantially flat both inside and outside of annular groove 36. Annular groove 36 encircles inlet port 22 and is sized to receive inlet O-ring 14. Thus, a diameter of annular groove 36 corresponds with a diameter of inlet port 22 such that annular groove 36 has a diameter slightly greater than that of inlet port 22. Notably, inlet port 22 preferably is not interiorly threaded.

Outlet portion 20 (shown partially in FIG. 1) is highly similar to inlet portion 18 in that it defines outlet port (not shown) and includes an exterior face (not shown) forming an annular groove (not shown). The annular groove associated with outlet portion 20 encircles the outlet port and is sized to receive outlet O-ring 16. As described in greater detail below, a diameter of the annular groove associated with outlet portion 20 is of a different size, preferably smaller, than a diameter of annular groove 34 of inlet portion 18.

FIG. 1 depicts two inlet coupling means 26 located on opposite sides of inlet port 22. For ease of illustration, only one of inlet coupling means 26 is described in detail, it being understood that each of inlet coupling means 26 are preferably identical. Inlet coupling means 26 is preferably integral with inlet portion 18 and includes an abutment surface 40 and a bearing surface 42 (shown partially in FIG. 1). Inlet coupling means 26 further forms a slot 44 extending from abutment surface 40 to bearing surface 42, preferably in a direction parallel with an axis of inlet port 22. Finally, bearing surface 42 is spaced from component side 32 by a gap 46. As described in greater detail below, slot 44 is preferably sized to receive a portion of a fastening device, such as a bolt (not shown). To this end, slot 44 is longitudinally accessible through a lower opening 48. Gap 46 is likewise open, and therefore accessible, both below and from a side of valve body 12.

Inlet mounting tab 28 is preferably integrally formed with inlet portion 18, extending downwardly (relative to the orientation of FIG. 1) therefrom. Inlet mounting tab 28 is flush with exterior face 34 of inlet portion 18 and includes a bore 50. Bore 50 is preferably sized to axially receive a portion of a fastening device, such as a bolt (not shown).

Outlet coupling means 30 is preferably integrally formed with outlet portion 20 and includes a slot 60 extending between an exterior surface 62 and a base 64. Slot 60 is defined by a first section 66 and a second section 68. First section 66 is open at exterior surface 62 and is sized to allow for passage of a portion of fastening device, such as a bolt (not shown). Second section 68 is open at first section 66 and has a height greater than that of first section 66. In particular, second section 68 is sized to capture an enlarged portion of a fastening device, as described in greater detail below. As shown in FIG. 1, a bearing surface 70 is generated at a transition from first section 66 to second section 68. Finally, slot 60 is open, or accessible from, a side of valve body 12. Notably, while FIG. 1 depicts one outlet coupling means 30, it should be understood that a second outlet coupling means (not shown) is preferably formed at an opposite side of outlet port (not shown).

The outlet mounting tab (not shown) is preferably integrally formed with outlet portion 20, extending downwardly (relative to the orientation of FIG. 1) therefrom. The outlet mounting tab is highly similar to inlet mounting tab 28 and is configured to axially receive a portion of a fastening device, such as a bolt (not shown).

Component side 32 is preferably configured to receive and maintain various sensing devices normally associated with industrial gas valves. For example, component side 32 may include a first area 72 for receiving a high pressure switch (not shown) and a second area 74 for receiving a low pressure switch (not shown). The pressure switches (or other devices) are simply affixed to the appropriate area 72, 74 so as to provide an indication of performance of valve 10. Notably, an opposite side of valve body 12 may also be configured to receive and maintain auxiliary components.

Inlet O-ring 14 and outlet O-ring 16 are similar in construction, preferably made of a rubber material commonly used with gas flow sealing applications. Alternatively, other suitable elastomers may be used. Inlet O-ring 14 is preferably sized to surround inlet port 22, and therefore has a diameter greater than that of inlet port 22. Similarly, outlet O-ring 16 is sized to encircle or surround the outlet port (not shown). In one preferred embodiment, inlet port 18 and the outlet port have an identical diameter. However, while inlet O-ring 14 and outlet O-ring 16 are sized to surround the respective port, inlet O-ring 14 has a diameter different from that of outlet O-ring 16. For example, in one preferred embodiment, inlet O-ring 14 has a diameter greater than a diameter of outlet O-ring 16. Alternatively, inlet O-ring 14 may have a diameter less than that of outlet O-ring 16. Notably, with this "reversed" configuration, sizing of the respective annular grooves (for example, annular groove 36) will change accordingly to correspondingly receive the respective O-ring. As described in greater detail below, by incorporating differently sized inlet O-ring 14 and outlet O-ring 16, a dual seal is achieved when valve 10 is mounted to another, similarly constructed gas valve.

Figure 2:
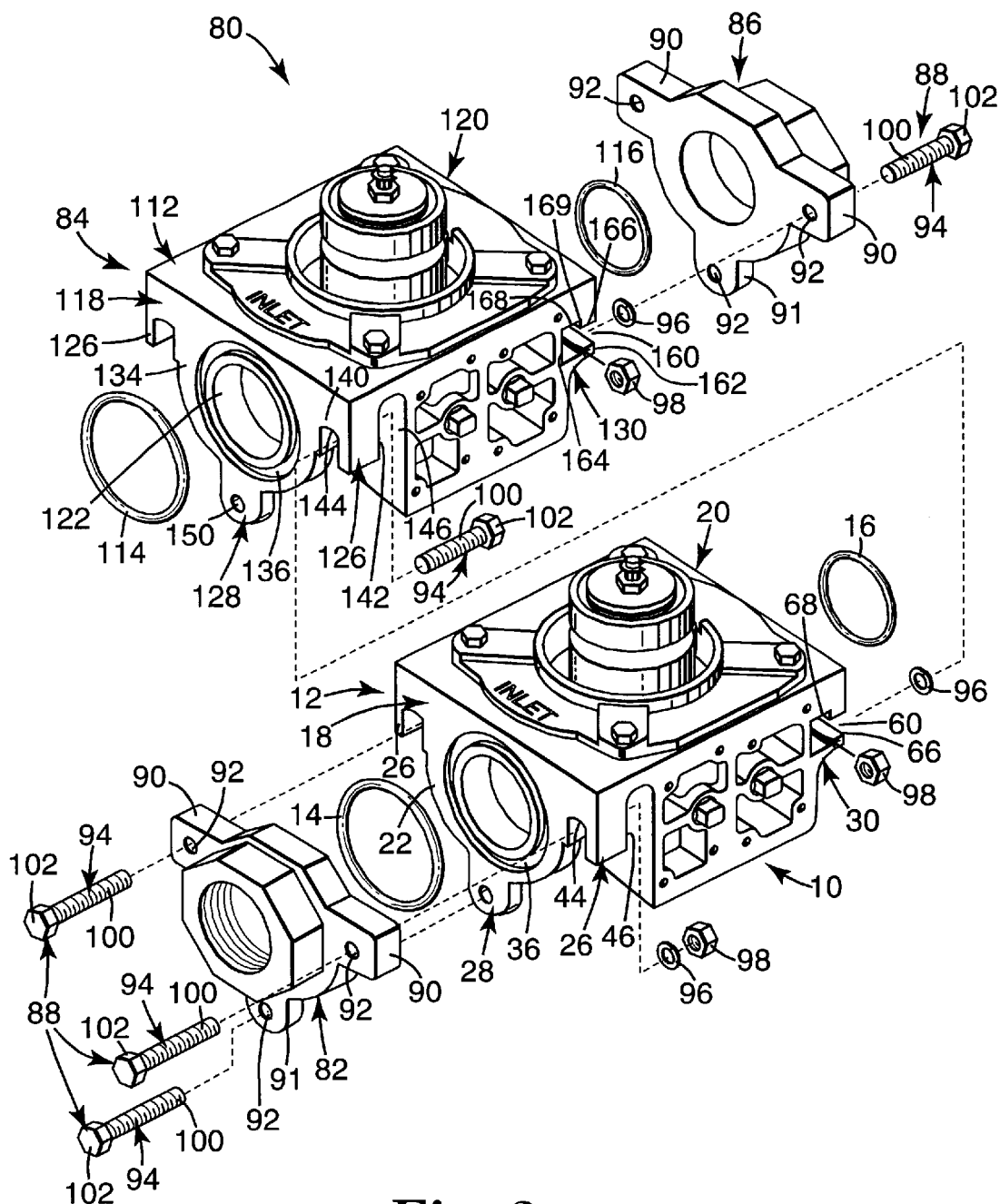
FIG. 2 is a perspective, exploded view of a valve train including two valves in accordance with the present invention.

Assembly of valve 10 as part of a valve train 80 is shown in FIG. 2. As a point of reference, valve train 80 includes valve 10, a first pipe adapter 82, a second valve 84, a second pipe adapter 86 and various fastening devices 88. First and second pipe adapters 82, 86 are identical and preferably include upper tabs 90 and a lower tab 91. Each of tabs 90, 91 includes a bore 92 sized to receive a portion of one fastening device 88. In a preferred embodiment, fastening device 88 includes a bolt 94, a lock washer 96 and a nut 98. Each bolt 94 includes a threaded shaft 100 extending from a bolt head 102. It should be understood that fastening device 88 may assume a wide variety of other forms commonly known, and need not include lock washer 96.

Second valve 84 is, in one preferred embodiment, identical to valve 10. Therefore, relevant features of second valve 84 are described in general terms below. Second valve 84 includes a valve body 112, an inlet O-ring 114 and an outlet O-ring 116. Valve body 112 includes an inlet portion 118 and an outlet portion 120 (shown partially in FIG. 2). Inlet portion 118 forms an inlet port 122; whereas outlet portion 120 forms an outlet port (not shown). Upon final assembly, inlet O-ring 114 is sized to surround inlet port 118. Similarly, outlet O-ring 116 is sized to surround the outlet port. To this end, inlet portion 118 includes an exterior face 134 forming an annular groove 136 for receiving inlet O-ring 114. Similarly, outlet portion 20 includes an exterior face (not shown) forming an annular groove (not shown) for receiving outlet O-ring 116. As with valve 10, inlet O-ring 114 has a diameter different from that of outlet O-ring 116. Thus, where second valve 84 is identical to one preferred embodiment of valve 10, inlet O-ring 114 of second valve 84 is greater in diameter than outlet O-ring 116. Further, inlet O-ring 114 of second valve 84 is substantially identical in diameter with inlet O-ring 14 of valve 10. Similarly, outlet O-ring 116 of second valve 84 is substantially identical in diameter with outlet O-ring 16 of valve 10. Finally, in one preferred embodiment, second valve 84 includes inlet coupling means 126, an inlet mounting tab 128, outlet coupling means 130 and an outlet mounting tab (not shown).

Generally, FIG. 2 depicts two inlet coupling means 126 located on opposite sides of inlet port 122, each including an exterior surface 140 and a bearing surface 142. A slot 144 extends between exterior surface 140 and bearing surface 142. Further, a gap 146 is formed opposite bearing surface 142. Outlet coupling means 130 includes a slot 160 extending between an exterior surface 162 and a base 164. Slot 160 includes a first section 166 and a second section 168. A bearing surface 169 is formed at the transition from first section 166 to second section 168.

Assembly of valve train 80 in accordance with one preferred embodiment includes first assembling first pipe adapter 82 to inlet portion 18 of valve 10. A grease, such as a general purpose lithium grease, is applied to annular groove 36. Inlet O-ring 14 is inserted into annular groove 36. Fastening devices 88 are used to couple first pipe adapter 82 to valve 10 (along with various other components of valve train 80). For purposes of clarity, reference to fastening device 88, and in particular bolt 94, lock washer 96 and nut 98, will be made generally with reference to one fastening device 88, it being understood, however, that multiple fastening devices 88 are employed throughout valve train 80, several of which are shown in FIG. 2.

In preferred arrangement, bolts 94 fitted with lock washers 96 are inserted through bores 92 associated with upper tabs 90 of first pipe adapter 82. Nuts 98 are then secured onto the ends of threaded shafts 100 of the bolts. First pipe adapter 82 is maneuvered adjacent to inlet portion 18 of valve 10 such that threaded shafts 100 slide upwardly into slots 44 of opposing inlet coupling means 26, respectively. When properly positioned, lock washer 96 and nut 98 are located within gap 46. A third bolt 94 is inserted through bore 92 of lower tab 91 and bore 50 of inlet mounting tab 28. A lock washer (not shown) and nut (not shown) are then secured over third bolt 94. All three fastening devices 88 are then tightened. In this regard, it should be noted that inlet coupling means 26 facilitates access to nuts 98 by a tightening tool (such as a wrench) via gap 46. Once tightened, inlet O-ring 14 provides a seal between inlet portion 18 and first pipe adapter 82.

Valve 10 is assembled to second valve 84. As shown in FIG. 2, valve 10 is mounted in a back-to-back relationship with second valve 84. First, the annular groove (not shown) of outlet portion 20 and annular groove 136 of inlet portion 118 are greased. Outlet O-ring 16 is inserted into the annular groove associated with outlet portion 20 of first valve 10. Similarly, inlet O-ring 114 is inserted into annular groove 136 of second valve 84. Two bolts 94 are provided (one of which is shown in FIG. 2), each having a lock washer 96 coaxially disposed over threaded shaft 100, abutting bolt head 102. A separate nut 98 is threaded onto each threaded shaft 100, positioned at an end opposite a respective bolt head 102. Each separate nut 98 is inserted into a respective one slot 60 of outlet coupling means 30, recalling that FIG. 2 depicts only one of two outlet coupling means 30. In particular, for each outlet coupling means 30, nut 98 is captured within second section 68 such that nut 98 abuts bearing surface 70. Threaded shaft 100 extends from nut 98 through first section 66. With both fastening devices 88 in place, second valve 84 is maneuvered toward valve 10 such that inlet portion 118 is adjacent, but slightly above, outlet portion 20. Second valve 84 is then maneuvered downwardly such that bolts 94 slide into slots 144 associated with the respective inlet coupling means 126 of second valve 84. A third bolt 94 (not specifically shown in FIG. 2) is extended through bore 150 of inlet mounting tab 128 and the opening in the outlet mounting tab (not shown) of outlet portion 20, and secured with a lock washer 96 and nut 98. All three fastening devices 88 are then tightened. In this regard, a single tool can be used to tighten fastening devices 88 associated with outlet coupling means 30 and inlet coupling means 126. Outlet coupling means 30 captures nut 98, limiting rotation thereof. Further, gap 146 in inlet coupling means 126 allows for access to bolt head 102 by a tool.

Figure 3:
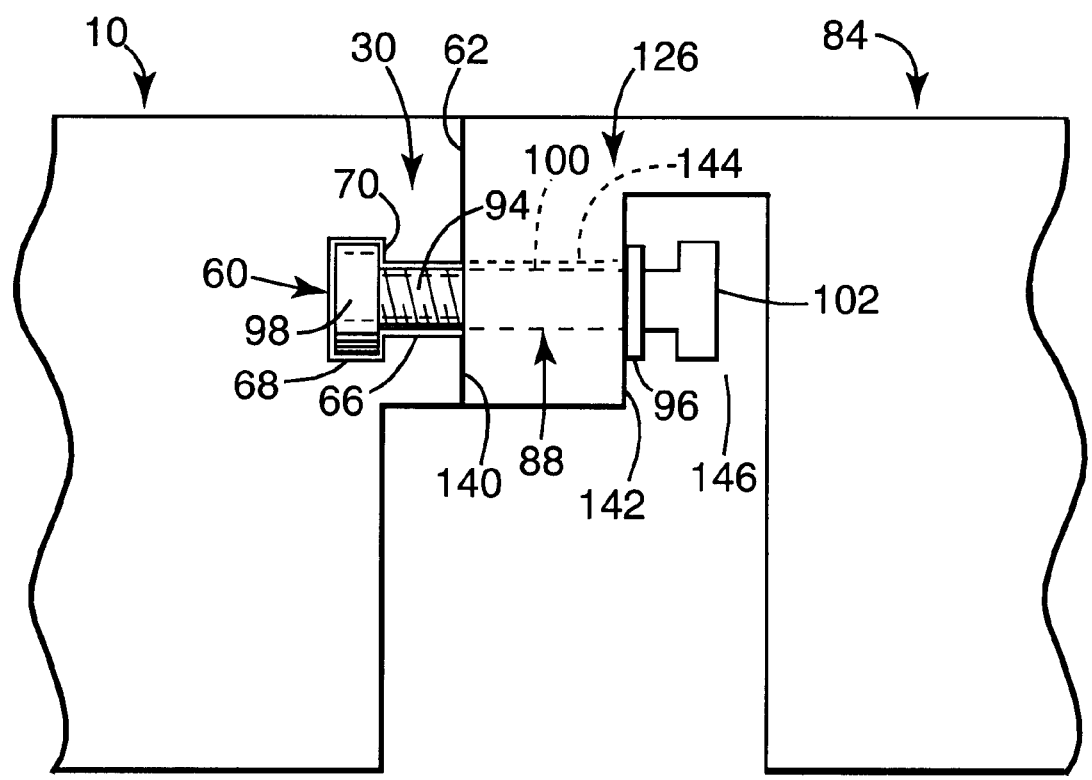
FIG. 3 is an enlarged, side view of a portion of the assembled valve train of FIG. 2.

FIG. 3 depicts the relationship between outlet coupling means 30 and inlet coupling means 126 in greater detail. As is clear from FIG. 3, the configuration of outlet coupling means 30 and inlet coupling means 126 can be reversed such that inlet coupling means 126 captures nut 98. Further, orientation of fastening device 88 may be reversed such that bolt head 102 is captured by outlet coupling means 30. Finally, it should be understood that only one preferred embodiment of outlet coupling means 30 and inlet coupling means 126 has been provided. A wide variety of other structural configurations may be employed whereby a portion of fastening device 88 (for example, nut 98 or bolt head 102) is captured so as to limit rotation thereof. The other available structural configurations include, in most basic terms, a slot sized in accordance with an enlarged portion of the fastening device employed. The slot is accessible from at least one direction relative to the valve body (i.e., from above, below or a side) so that the relevant portion of the fastening device can readily be inserted or removed from the slot.

Figure 4:
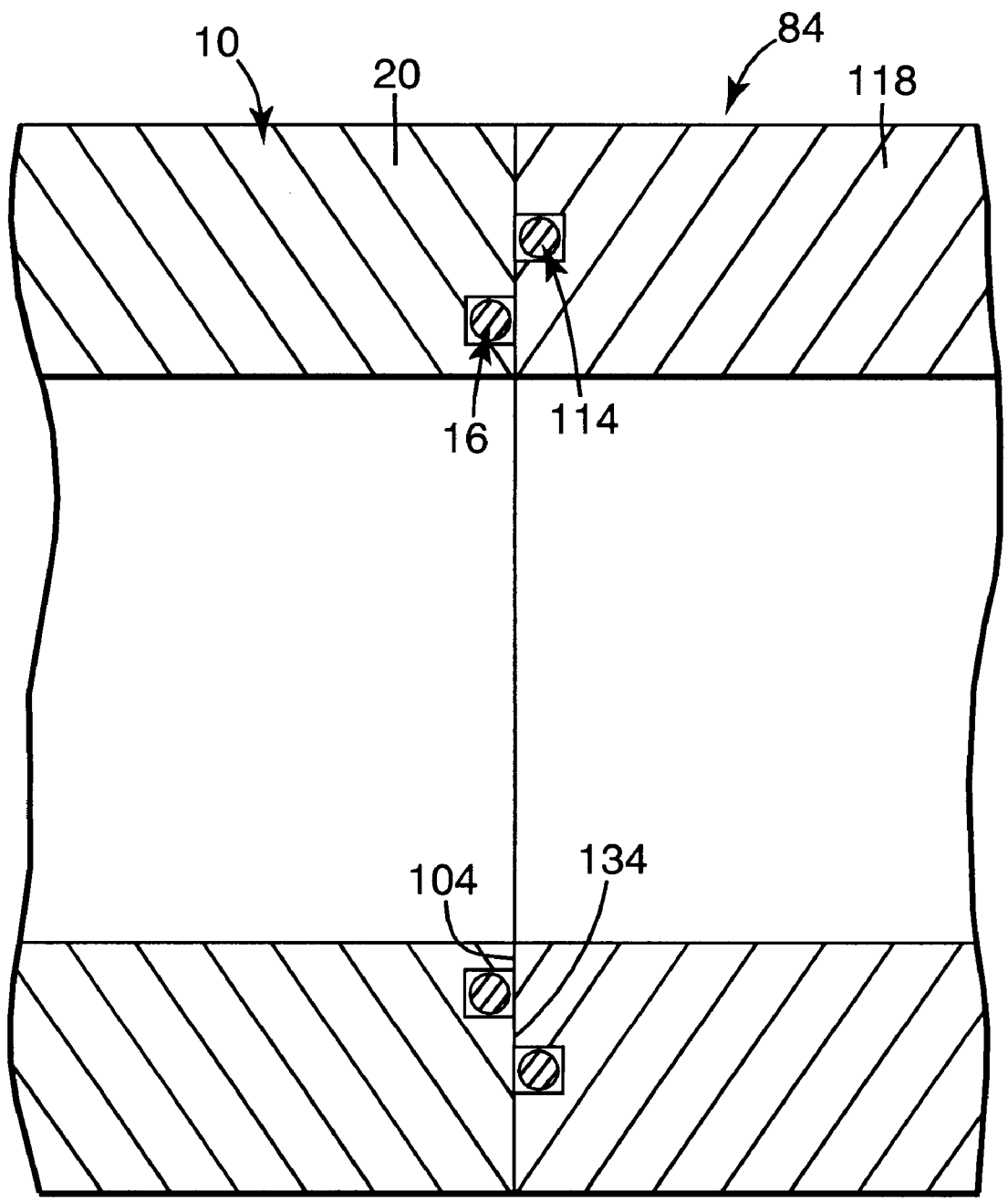
FIG. 4 is an enlarged, cross-sectional view of a portion of the assembled valve train of FIG. 2.

When assembled back-to-back, a dual seal is provided between valve 10 and second valve 84. More particularly, as shown in FIG. 4, outlet O-ring 16 and inlet O-ring 114 each form an independent seal between outlet portion 20 and inlet portion 118. For example, outlet O-ring 16 contacts and seals against exterior face 134 of second valve 84, whereas inlet O-ring 114 contacts and seals against exterior face 104 of first valve 10. Particularly, the dual seal configuration is achieved by incorporating differently-sized outlet O-ring 16 and inlet O-ring 114. Importantly, O-rings 16, 114 are sized so as to not interfere with one another upon assembly. In other words, outlet O-ring 16 does not contact inlet O-ring 114, and vice-versa. Instead, metal-to-metal contact is provided for each O-ring 16, 114.

Returning to FIG. 2, second pipe adapter 86 is assembled to outlet portion 120 of second valve 84. Annular groove (not shown) associated with outlet portion 120 is greased. Outlet O-ring 116 is placed within the annular groove. Nut 98 is placed within slot 160 associated with each outlet coupling means 130 (one of which is shown in FIG. 2). Once again, second section 168 is sized to capture nut 98, limiting rotation thereof. Two bolts 94 (one of which is shown in FIG. 2) are provided, each having a lock washer 96 abutting a respective bolt head 102, and passed through bores 92 in upper tabs 90 of second pipe adapter 86. Second pipe adapter 86 is then maneuvered such that threaded shafts 100 of previously positioned bolts 94 threadably engage a respective nut 98. A third bolt 94 (not specifically shown in FIG. 2) is passed through lower tab 91 and outlet mounting tab (not shown) of second valve 84. All fastening devices 88 are then tightened. In this regard, outlet coupling means 130 facilitates rapid fastening by preventing rotation of nuts 98.

During use, valve train 80 operates in accordance with the internal functional characteristics associated with valve 10 and second valve 84. In this regard, while both valve 10 and second valve 84 are shown as being fluid power valves, any other gas valve type currently available, or in the future conceived, may be used for either valve 10 or second valve 84. Thus, valve 10 and/or second valve 84 may alternatively be a diaphragm valve, a solenoid valve, a vent valve, a shut-off valve, a metering valve, a butterfly valve, etc. Notably, valve 10 need not be identical to second valve 84. Preferably, however, each of valve 10 and second valve 84 includes corresponding inlet and outlet design characteristics to facilitate rapid, back-to-back series mounting. More particularly, each of valve 10 and second valve 84 includes an inlet O-ring and an outlet O-ring. The respective inlet O-rings are similarly sized; as are the respective outlet O-rings. However, the inlet O-rings have a diameter different from a diameter of the outlet O-rings such that when the valves 10, 84 are mounted back-to-back, a dual seal is achieved. Additionally, in one preferred embodiment, valve 10 and second valve 84 incorporate corresponding inlet and outlet coupling means. More particularly, one of either of the inlet coupling means or the outlet coupling means is configured to capture a portion of an associated fastening device so as to facilitate rapid mounting.

Figure 5:
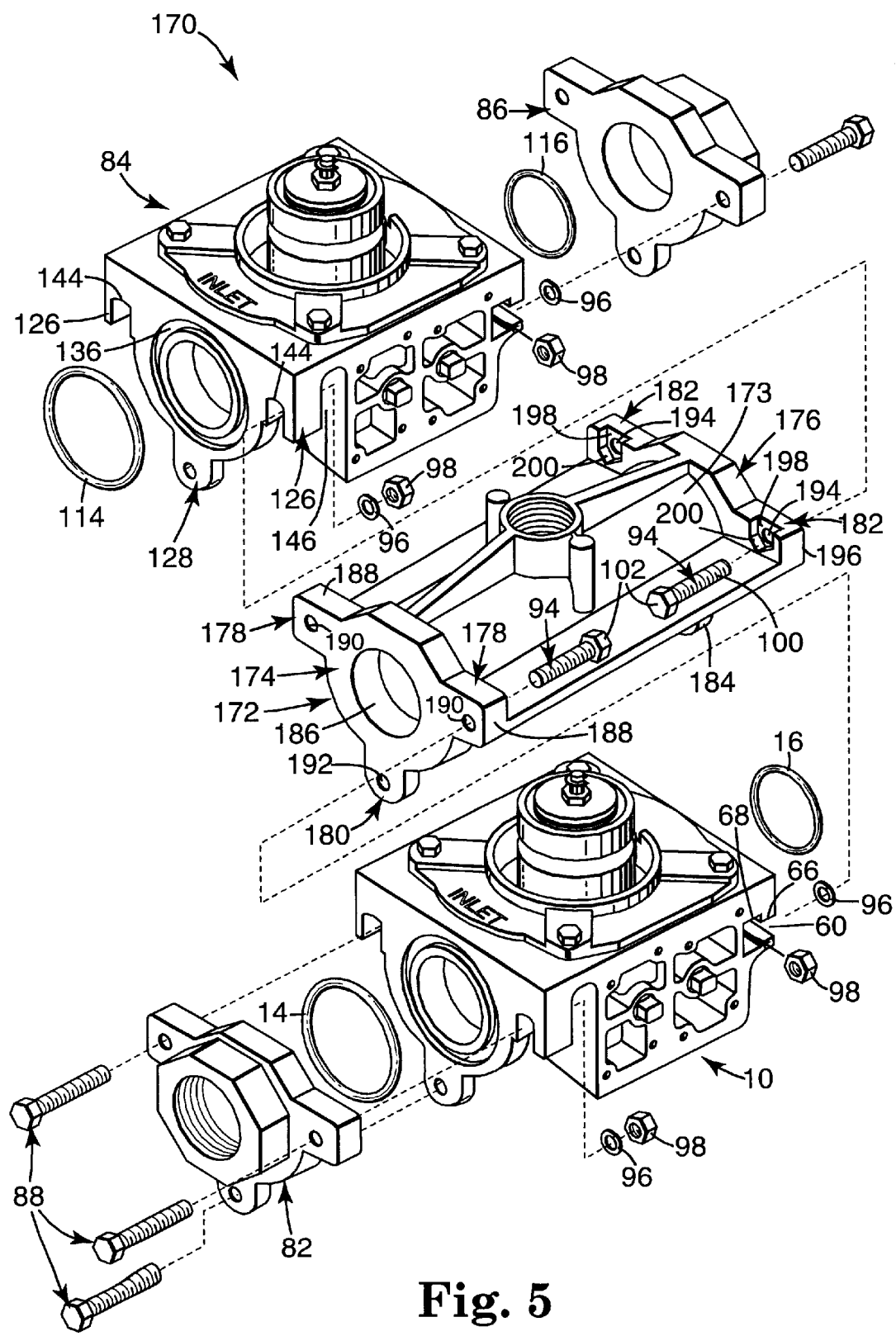
FIG. 5 is a perspective, exploded view of an alternative embodiment valve train in accordance with the present invention.

As described above, valves in accordance with the present invention are not limited to the fluid power valve design shown in the various figures. By incorporating the inventive features of the present invention, a variety of different valve types can be directly mounted in series. For example, FIG. 5 provides an exploded view of an alternative valve train 170. Valve train 170 includes several elements previously described in detail, including first pipe adapter 82, valve 10, second valve 84 and second pipe adapter 86. Details on these components are provided above, and like reference numerals are reflected in FIG. 5. Additionally, valve train 170 includes valve adapter 172 configured to receive a vent valve (not shown). Valve adapter 172 includes an adapter body 171 defining an inlet portion 174, an outlet portion 176, inlet coupling means 178, an inlet mounting tab 180, an outlet coupling means 182, an outlet mounting tab 184 and a valve connection port 185. Inlet portion 174 is preferably integrally formed with inlet coupling means 178 and inlet mounting tab 180, an defines an inlet port 186. Similarly, outlet portion 176 is preferably integrally formed with outlet coupling means 182 and outlet mounting tab 184 and defines an outlet port (not shown). FIG. 5 depicts two inlet coupling means 178, each comprising a radial extension 188 forming a passage 190. Inlet mounting tab 180 similarly forms a passage 192. FIG. 5 depicts two outlet coupling means 182, formed at opposite sides of outlet port (not shown). In this regard, each outlet coupling means 182 includes a bore 194 extending between an exterior surface 196 and a bearing surface 198. In this regard, a slot 200 is formed at bearing surface 198. Slot 200 is sized to capture a portion of a fastening device 88, such as nut 98 or bolt head 102. Finally, outlet mounting tab 184 forms an axial passage (not shown). Finally, valve connection port 185 is interiorly threaded for fluid connection to a separate valve (not shown), such as a vent valve.

Assembly of valve train 170 is highly similar to that previously described for valve train 80 (FIG. 2). First pipe adapter 82 is assembled to valve 10 as previously described. Valve adapter 172 is then assembled to valve 10. Outlet O-ring 16 is secured to outlet portion 20 so as to surround outlet port (not shown). Outlet portion 20 of valve 10 is mounted to inlet portion 174 of valve adapter 172 via three of fastening devices 88. A nut 98 is placed into each of outlet coupling means 30 (one of which is shown in FIG. 5) of valve 10 such that nut 98 is captured within second section 68 of slot 60. Two bolts 94 (one of which is shown in FIG. 5), each with a lock washer 96 coaxially positioned against a respective bolt head 102, are inserted through passages 190 of inlet coupling means 178 and threaded to previously positioned nuts 98, respectively. A third bolt 94 (not specifically shown in FIG. 5) is passed through the outlet mounting tab (not shown) and inlet mounting tab 180, and secured with a lock washer 96 and nut 98. All three fastening devices 88 are tightened. In this regard, placement of nuts 98 in second sections 68 of slot 60 limits rotation of nut 98, thereby facilitating rapid fastening.

Valve adapter 172 is then assembled to second valve 84 by first inserting inlet O-ring 114 into annular groove 136. Two bolts 94 (one of which is shown in FIG. 5) are then passed through bores 194 associated with each of outlet coupling means 182. In this regard, slots 200 associated with outlet coupling means 182 receive and maintain a respective bolt head 102, limiting rotation thereof. A lock washer 96 and a nut 98 are then placed over threaded shaft portion 100 of the previously positioned bolts 94. Second valve 84 is then maneuvered adjacent to valve adapter 172 such that each of threaded shafts 100 slide into slot 144 associated with inlet coupling means 126, respectively. A third bolt 94 (not specifically shown in FIG. 5) is passed through outlet mounting tab 184 and inlet mounting tab 128, and receives a lock washer 96 and nut 98. The three fastening devices 88 are then tightened so as to secure outlet portion 176 to inlet portion 118. Once again, access to nuts 98 by a tool is facilitated by gap 146 associated with inlet coupling means 128. Further, slots 200 associated with outlet coupling means 182 limit rotation of respective bolt heads 102, thereby facilitating rapid assembly.

Finally, second pipe adapter 86 is assembled to second valve 84 in a manner previously described.

In the event a valve 10, or 84, or valve adapter 172 associated with valve train 170 malfunctions, a replacement can be rapidly installed. The above-described assembly procedure associated with a particular valve is simply reversed, that valve removed, and replaced with a new valve. Thus, unlike previous designs, it is unnecessary to remove and potentially replace various pipe nipples. Further, unlike an integrally casted, dual valve design, malfunction of one valve does not render the entire valve train scrap.

The gas flow control valve of the present invention provides a marked improvement over previously used designs. In particular, where code (or other certain design preferences) requires implementation of two valves mounted in series, the present invention facilitates direct, back-to-back assembly. In particular, a wide variety of different type valves can be provided, each having an inlet portion with an inlet O-ring of a first size and an outlet portion maintaining an outlet O-ring of a different size. When assembled back-to-back, the inlet O-ring and the outlet O-ring each form an independent seal between the two valve bodies. To this end, a sizing of the O-rings is specifically selected so that upon final assembly, the O-rings do not contact one another, but instead directly contact each of the respective valve bodies. Further, in accordance with one preferred embodiment of the present invention, each of the two valves includes a coupling means configured to facilitate rapid assembly and disassembly whereby a portion of a respective fastening device is prevented from rotating. Thus, the gas valve of the present invention provides for a valve train having readily interchangeable valves.

Although the present invention has been described with reference to preferred embodiments, workers skilled in the art will recognize that changes may be made in form and detail without departing from the spirit and scope of the present invention. For example, the gas valve has been described as having inlet coupling means configured to provide access to a fastening device and an outlet coupling means configured to limit rotation of a portion of the fastening device. However, these relationships can be reversed such that the inlet coupling means limits fastener rotation. Similarly, while each valve has been shown as incorporating three coupling means, any other number, either larger or smaller, is acceptable. Along these same lines, the described use of mounting tabs at both the inlet and outlet may be eliminated.

What is claimed:

1. In a fluid control device of the type including an inlet portion having a first surface with an inlet port therein and an outlet portion having a second surface with an outlet port therein, the inlet and outlet portions being of complementary configurations which permit the outlet port of either of two devices having such inlet and outlet portion configurations to be directly joined in a fluid tight manner to the inlet port of the other such device, the improvement which comprises:

a first groove in the first surface, said first groove being of a first diameter and surrounding the inlet port for accommodating a first O-ring; and a second groove in the second surface, said second groove being of a second diameter different from the first diameter and surrounding the outlet port for accommodating a second O-ring, whereby, when two of the fluid control devices are connected in an outlet to inlet arrangement, sealing may be achieved with dual concentrically arranged O-rings.

2. The fluid control device of claim 1, wherein said inlet port and said outlet port have an identical diameter.

3. The fluid control device of claim 1, wherein the first diameter is greater than the second diameter.

4. The fluid control device of claim 1, wherein the first diameter is less than the second diameter.

5. The fluid control device of claim 1, wherein the first and second surfaces are generally planar surfaces.

6. The fluid control device of claim 5 wherein: said fluid control device is part of a gas valve assembly including a first gas valve and an auxiliary device, each with first and second flanges respectively having the inlet and outlet ports therein, the first gas valve and the auxiliary device being connected together with the outlet flange of one of the first gas valve and the auxiliary device adjoining the inlet flange of the other of the first gas valve and the auxiliary device; and an O-ring is provided in at least one groove surrounding the outlet and inlet ports in the adjoining outlet and inlet flanges.

7. The gas valve assembly of claim 6 wherein:
said auxiliary device is a second gas valve; and
O-rings are provided in concentric grooves surrounding the outlet and inlet ports in both adjoining outlet and inlet flanges to achieve dual seals.

8. The gas valve assembly of claim 6 wherein the first gas valve and the auxiliary device are connected together by at least one bolt extending through apertures in the adjoining outlet and inlet flanges and a nut mating with the at least one bolt, one of the adjoining inlet and outlet flanges being configured to capture and prevent rotation of one of the at least one bolt and the mating nut, the other of the adjoining inlet and outlet flanges being configured to permit rotation of the other of the at least one bolt and the mating nut.

9. A back-to-back valve train comprising:
a first valve comprising:
    a first valve body including a first valve inlet portion, defining a first valve inlet port, and a first valve outlet portion defining a first valve outlet port,
    a first valve outlet O-ring surrounding said first valve outlet port; and
a second valve comprising:
    a second valve body including a second valve inlet portion, defining a second valve inlet port, and a second valve outlet portion defining a second valve outlet port,
    a second valve inlet O-ring surrounding said second valve inlet port;
wherein said first valve outlet portion is configured to abut said second valve inlet portion such that said first and second valves are mounted back-to-back, and further wherein first said valve outlet O-ring has a diameter different from a diameter of said second valve inlet O-ring such that each of said first valve outlet O-ring and said second valve inlet O-ring form a seal between said first valve outlet portion and said second valve inlet portion.

10. The valve train of claim 9, wherein said first valve outlet O-ring has a diameter less than a diameter of said second valve inlet O-ring.

11. The valve train of claim 9, wherein said first valve outlet O-ring has a diameter greater than a diameter of said second valve inlet O-ring.

12. The valve train of claim 9, wherein said first valve further includes a first valve inlet O-ring surrounding said first valve inlet port, and further wherein said first and second valve inlet O-rings are of an identical diameter.

13. The valve train of claim 12, wherein said second valve further includes a second valve outlet O-ring surrounding said second valve outlet port, and further wherein said first and second valve outlet O-rings are of an identical diameter.

14. The valve train of claim 9, wherein said first valve is a gas valve selected from the group consisting of a diaphragm valve, solenoid valve, vent valve, metering valve, butterfly valve, and fluid power valve.

15. The valve train of claim 14, wherein said second valve is a gas valve selected from the group consisting of a diaphragm valve, solenoid valve and fluid power valve.

16. The valve train of claim 9, wherein said first valve further includes an outlet coupling means and said second valve further includes an inlet coupling means, wherein said outlet coupling means and said inlet coupling means are configured to rapidly couple said first valve outlet portion directly to said second valve inlet portion with a fastening device.

17. The valve train of claim 16, wherein said fastening device is a bolt including a bolt head and a threaded shaft for threadably receiving a nut, and further wherein one of said outlet and inlet coupling means is configured to capture one of said bolt head and said nut.

18. The valve train of claim 17, wherein the other of said outlet and inlet coupling means is configured to allow access to, and rotation of, the other of said bolt head and said nut.

* * * * *